United States Patent

[11] 3,569,840

[72] Inventors Edward H. Tanaka; James C. Riach, Toronto, Ontario, Canada

[21] Appl. No. 765,227
[22] Filed Oct. 4, 1968
[45] Patented Mar. 9, 1971
[73] Assignee Collins Radio Company of Canada, Ltd.

[54] CARRIER SQUELCH SCHEME
8 Claims, 2 Drawing Figs.

[52] U.S. Cl. .......... 325/402, 325/403, 325/473, 325/478
[51] Int. Cl. .......... H04b 1/16
[50] Field of Search .......... 325/402, 403, 478, 473

[56] References Cited
UNITED STATES PATENTS

| | | | |
|---|---|---|---|
| 2,179,974 | 11/1939 | Beers | 325/478 |
| 2,237,457 | 4/1941 | Tellegen | 325/478 |
| 2,980,794 | 4/1961 | Hargreaves et al. | 325/478 |
| 3,188,571 | 6/1965 | Michael | 325/402 |

*Primary Examiner*—Robert L. Griffin
*Assistant Examiner*—Albert J. Mayer
*Attorneys*—Warren H. Kintzinger and Robert J. Crawford

ABSTRACT: A carrier squelch system monitoring both an AGC voltage developed in a superheterodyne receiver and the signal level present in the receiver as represented by the IF carrier signal, with inverse variation of the gain of an AC amplifier in the squelch circuit under control of the AGC voltage, developed out of the IF section of the receiver, in the squelch circuit, and with the IF staging such that the receiver is normally in hard AGC with noise input alone. The additional stages of amplification through the squelch circuit are AC signal amplification stages with temperature change and supply voltage level change induced operational variations minimized.

Figure 1:
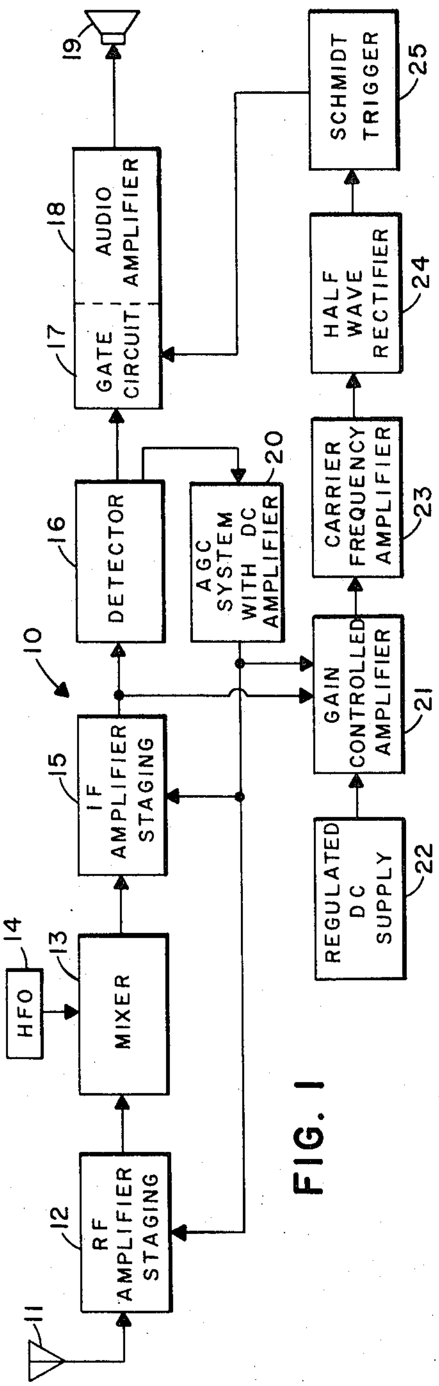

INVENTORS.
EDWARD H. TANAKA
JAMES C. RIACH
BY Warren H. Kintzinger
ATTORNEY

CARRIER SQUELCH SCHEME

This invention relates in general to radio receiver squelch systems, and in particular, to a carrier squelch system monitoring both the IF AGC voltage and the signal level present in the receiver for squelch control.

VHF and UHF AM receivers generally utilize squelch for suppressing noise when no signal is being received. Desired squelch features include rapid turnon and turnoff action free from clicks, pops, and thumps; immunity to turnon by high ambient noise, atmospheric, cosmic, or manmade. Various combinations of desired squelch connected through capacitor 42 and coil 43, in parallel, to the collector output of NPN transistor 38. The emitter of NPN transistor 38 is connected features are handled by various known squelch systems and with varying degrees of success by the respective squelch systems.

Various existing carrier squelch systems normally derive their operating voltage from a receiver AGC DC voltage line along with such squelch systems generally operating on the sum of carrier and noise at the receiver IF output. Thus, such squelch systems may be operated by noise alone with high ambient noise, or with increased receiver gain. Furthermore, particularly with multichannel equipment, gain and squelch threshold may vary considerably from channel to channel, and adjustment is required for varying the threshold in accordance with a particular noise level and receiver gain at any given time. Various of these prior art squelch systems are suitable to a greater or lesser extent for their intended applications. Further, since carrier squelch design is intimately tied in with overall receiver design, the characteristics of the IF AGC voltage, the receiver gain distribution, the selectivity of the receiver and the temperature variation in receiver gain must be considered with respect to a particular design chosen. It should be realized that sophisticated squelch schemes such as carrier to noise squelch systems used with some airborne radio systems are not particularly suitable with, for example, packset radio sets because of the higher power consumption and higher cost factors encountered with such sophisticated systems.

When a relatively simple carrier squelch system is required, usually the IF AGC DC voltage is monitored to operate a switch for squelch with DC amplifiers being used in translating the IF AGC DC voltage change into a control voltage change for the squelch gate. With most of these simple carrier squelch systems, however, considerable care is required in the design of the DC amplifiers, as well as close control and compensation for temperature affects along with a requirement for careful analysis of the affect of variation in transistor parameters not only in the squelch circuit itself, but also in all the RF and IF circuitry involved in the receiver AGC system.

It is, therefore, a principal object of this invention to provide a carrier squelch system generally free of most problems generally encountered with preexisting squelch systems and particularly those encountered with preexisting carrier squelch systems.

Another object is to provide such a carrier squelch system monitoring both the IF AGC voltage and the signal level present in the receiver for squelch control.

A further object of such a carrier squelch system is to improve receiver squelch action through a carrier squelch circuit with inverse variation of the gain of an AC amplifier under control of the IF AGC voltage.

Features of this invention useful in accomplishing the above objects include, in a carrier squelch system, monitoring of both the AGC voltage developed in a radio receiver and the signal level present as represented by the IF carrier signal. It is a squelch circuit with both of these signals applied to an amplifier stage with inverse variation of gain under control of the AGC voltage developed out of the IF section of the receiver, that is, the gain of the first amplifier stage of the squelch circuit is varied oppositely to variation of the gain of the RF and IF stages having AGC control. The remainder of the amplification stages, after the first amplifier stage, through the squelch circuit are AC signal amplification stages, thereby advantageously minimizing adverse variation with changes in temperature and shifting of supply voltage levels.

A specific embodiment representing what is presently regarded as the best mode of carrying out the invention is illustrated in the accompanying drawing.

Figure 2:
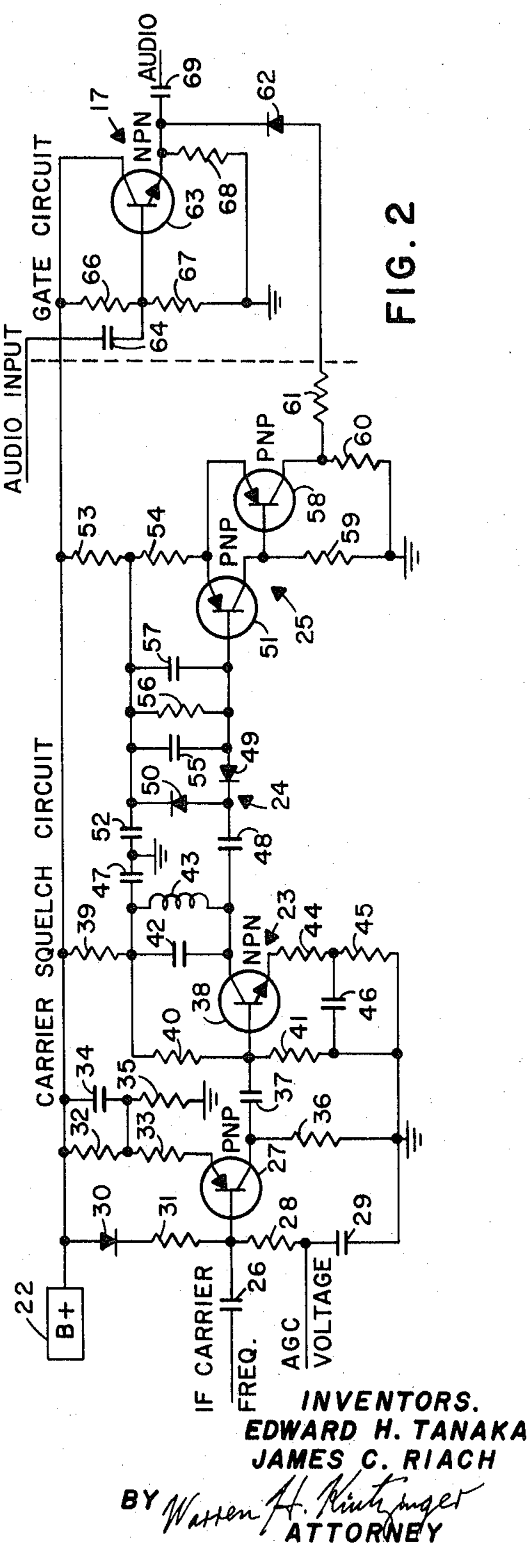

In the drawing:

FIG. 1 represents a superheterodyne radio receiver equipped with AGC and a carrier squelch circuit connected to IF staging carrier output and an AGC voltage line; and FIG. 2, is a detailed schematic of the noise squelch circuit of FIG. 1.

Referring to the drawing:

The superheterodyne receiver 10 of FIG. 1 receives an RF signal from antenna 11. The RF signal is fed through the RF amplifier staging 12 to mixer 13 where it is mixed with the high frequency signal of oscillator 14. The output of mixer 13 is fed to IF amplifier staging 15, the output of which is passed successively through detector 16, gate circuit 17, and audio amplifier 18 to speaker 19. Please note that the gate circuit 17 may also contribute some amplification to the audio signal amplifier 18. The AGC circuit 20 connected for receiving IF carrier signal rectified DC from detector 16, provides for applying automatic gain control signal voltage to the IF amplifier 15 and RF amplifier 12 in a conventional manner. The automatic gain control signal voltage developed from the IF carrier and amplified through the AGC circuit 20, including a DC amplifier, is also applied as an input to gain controlled amplifier 21 along with the IF signal (500 kHz. in a working embodiment) as an additional input to the amplifier 21. A regulated DC supply 22 is also connected to gain control amplifier 21, and the output of amplifier 21 is passed to carrier frequency amplifier 23. A signal path connection is provided from amplifier 23 to a half-wave rectifier 24 having an output connection to Schmidt trigger circuit 25, the output of which is connected to gate circuit 17 for squelch action opening and closing of the gate circuit 17.

Referring also to FIG. 2, the carrier squelch circuit is shown to be provided with an IF carrier frequency signal input connection through capacitor 26 to the base of PNP transistor 27. An additional input is provided thereto from the AGC voltage line out of AG system 20 through a resistor 28 to the base of PNP transistor 27 and this is with the AGC voltage line end of resistor 28 AC grounded via capacitor 29. A regulated voltage supply 22 feeds the base of PNP transistor 27 through temperature compensating diode 30 and resistor 31 with the anode of the diode 30 connected to voltage supply 22 and cathode connected through resistor 31 to junction of the capacitor 26, resistor 28 and the base of PNP transistor 27. Voltage supply 22 also feeds the emitter of PNP transistor 27 through a resistive capacitive network including series connected resistors 32 and 33 between voltage supply 22 and the emitter of PNP transistor 27 and with capacitor 34 connected in parallel with resistor 32 and with an additional resistor 35 connected between the junction of resistors 32 and 33 and ground and with the resistor 35 providing for emitter degeneration to decrease variation in transistor stage gain with differences in hFE of transistor 27.

The output collector of PNP transistor 27 is connected both through resistor 36 to ground, and also through signal coupling capacitor 37 to the base of NPN transistor 38 functioning as a common emitter transistor AC signal amplifier stage of carrier frequency amplifier 23. This is with biasing of NPN transistor 38 provided by resistors 39, 40 and 41 series connected between the voltage supply 22 and ground, with the common junction of resistors 40 and 41 connected to the junction of capacitor 37 and the base of transistor 38, and with the common junction of resistors 39 and 40 connected through capacitor 42 and coil 43, in parallel to the collector output of NPN transistor 38. The emitter of NPN transistor 38 is connected through resistors 44 and 45 to ground and the junction of resistors 44 and 45 connected through capacitor 46 to ground. The common junction of resistors 39 and 40, capacitor 42 and coil 43 is connected through capacitor 47 t ground. Please note that resistor 44 provides degeneration to reduce variation in stage gain with differences in hFE of NPN transistor 38.

The amplified signal output from the collector of NPN transistor 38 is coupled through capacitor 48 to a half-wave rectifier circuit 24 arranged as a voltage doubler having two diodes 49 and 50 with diode 49 connected cathode to capacitor 48 and anode to PNP transistor 51, of Schmidt trigger circuit 25, and with diode 50 connected anode to the junction of the capacitor 48 and diode 49 and cathode to capacitor 52 and through the capacitor 52 to ground. Resistors 53 and 54 are series connected between voltage supply 22 and the emitter of PNP transistor 51 and the common junction of resistors 53 and 54 is connected to the junction of capacitor 52 and the cathode of diode 50. The junction of resistors 53 and 54 is also connected in parallel through capacitor 55, resistor 56 and an additional capacitor 57 to the junction of the anode of diode 49 and the base of PNP transistor 51.

The emitter of PNP transistor 51 is connected in common with the emitter of a second PNP transistor 58, of the Schmidt trigger circuit 25, through the resistors 54 and 53 to the voltage supply 22. Further, the collector of PNP transistor 51 is connected both to the base of PNP transistor 58 and also through resistor 59 to ground.

The output collector connection of PNP transistor 58, and of the Schmidt trigger circuit 25, is connected both through resistor 60 to ground, and also through resistor 61 in the output signal path to diode 62 of gate circuit 17 with the anode of the diode connected to the resistor 61 and cathode thereof connected to the emitter of NPN transistor 63. When high voltage is developed in the output of the carrier squelch circuit as applied to the anode of diode 62 so as to bias diode 62 to conduction, the NPN transistor 63 is reverse biased with respect to its base emitter junction thereby effecting turnoff of the transistor 63 and squelching of the receiver with the audio signal path being from the audio input line thereto through capacitor 64 to the base of the NPN transistor 63. The audio signal variation excursions in the line connection between capacitor and base is maintained about an average voltage level and desired voltage bias at the base of transistor 63 is provided via resistors 66 and 67 series connected between voltage supply 22 and ground and with the resistor common junction common to the line connection between capacitor 64 and the base of the transistor 63. The collector of NPN transistor 63 is also connected to the voltage supply 22 while the emitter thereof is connected as an emitter follower through resistor 68 to ground and also in the signal output path, in addition to its connection to the cathode of diode 62, through capacitor 69 to and through additional audio amplifier staging of audio amplifier 18. Please note that gate circuit 17 may actually, with transistor 63, provide audio amplification as part of amplifier 18.

The radio receiver 10 is so designed that normally the IF staging is in hard AGC with noise input, and reception of a desired RF signal will not materially affect the selected IF signal, for example, 500 kc. at the input to detector 16, due to the AGC action of the receiver. However, a good indication of received signal strength is provided through monitoring the AGC DC voltage level. In a particular AM radio set receiver employing applicant's carrier squelch system, a great deal of gain is provided through the RF and IF staging circuits, such as, for example, approximately 97 db. of gain. Such good operational AGC action is provided that there is less than 3 db. change in audio output of the receiver for as much as over 86 db. change in RF signal input strength. This is accomplished in one receiver with RF and IF AGC voltage applied to six amplifier stages and with the design such that very little change in AGC voltage is experienced over the dynamic range of the radio; typically a change from 7 volts to 3 volts over an input range from 3 microvolts to 100,000 microvolts. With this particular receiver as the squelch trip point is adjusted to operate with input levels from 0 to 50 microvolts, a change of less than 0.5 volts in the IF AGC voltage is available for control of the squelch trip point.

With the particular radio receiver that has been built, the PNP transistor 27 of the carrier squelch circuit is operated as an expander amplifier with the 500 kHz. output of IF amplifier staging 15 sampled and fed through capacitor 26 to the base of the transistor 27. The 500 kHz. signal at the sampling point varies only 3 to 4 db. over the entire dynamic range of the receiver with a greater than 86 db. variation in the RF received signal since it is so heavily AGC action controlled through the main IF AGC and RF AGC circuits. In providing accurate control of the carrier squelch trip point, the 500 kHz. output of the expander amplifier transistor 27 works in an opposite gain controlled manner to the direction of receiver gain variation brought about through the main IF AGC and RF AGC. The dynamic range of the input signal to the carrier squelch circuit is increased in this expander circuit with the transistor 27 biased both from the regulated voltage supply 22 and from the IF AGC voltage line. The regulated voltage supply 22 feeds the base of transistor 27 through temperature compensating diode 30 and resistor 31. It also feeds the emitter of the transistor 27 through a resistive network as shown in FIG. 2. The base of transistor 27 is connected to the IF AGC line through resistor 28 and that is RF grounded via capacitor 29. Under no RF signal input conditions to the receiver 10, the IF AGC voltage developed is at a relatively high positive voltage of approximately 7 volts and transistor 27 is effectively biased to the cutoff state. As an RF signal is received and increased in strength, the IF AGC voltage drops decreasing gain through RF amplifier staging 12 and IF amplifier staging 15 and simultaneously permitting base current in transistor 27 to flow, thereby providing an increasing gain in this transistor 27 squelch amplifier stage. The resulting expanded output is signal coupled through capacitor 37 to the carrier frequency amplifier stage transistor 38 where the 500 kHz. signal is amplified further through this common emitter stage. This is with resistor 44 providing such degeneration as to reduce variation in stage gain with differences in hFE of the transistor 38. The resulting amplified signal is then coupled through capacitor 48 to half-wave rectifier and voltage doubler circuit 24. Then after rectification and filtering, the resulting negative DC voltage is applied to the base of PNP transistor 51 of the two-transistor Schmidt trigger circuit 25. Under the no RF received signal input condition, the collector of transistor 58 is maintained at, relatively, a high positive voltage. With sensing of, and with increase of an RF received signal, a negative voltage is developed to, when a sufficient negative voltage is developed, cause the transistors 51 and 58 to rapidly change state. Transistor 58 is thereby rapidly cut off with, as a result, the voltage being developed across resistor 60 dropping to substantially zero and the receiver is returned to the unsquelched state. When, however, relatively high voltage is developed at this point, diode 62 is biased to conduction and the base emitter junction of transistor 63 is reverse biased, thereby turning off the transistor 63 and effecting thereby squelch action opening of the audio circuit and squelching of the receiver. Whenever, however, the voltage passed through resistor 61 at the anode of diode 62 drops to substantially zero, the diode 62 is reverse biased thereby allowing NPN transistor 63 to operate in a normal audio signal transmitting fashion thereby unsquelching the receiver 10.

Components used in a carrier squelch circuit and gate circuit 17 as shown in FIG. 2 include the following:

Capacitors 26,29,34,37,47, and 52 —4,700 pf
PNP transistors 27,51, and 58 —2N2907A
Resistors 28 and 31 —5K Ohms
Diode 30 —FD 100
Resistor 32 —2K Ohms
Resistors 33 and 53 —470 Ohms
Resistor 35 —20K Ohms
Resistor 36 —4K Ohms
NPN transistor 38 —2N930
Resistors 39 and 45 —1K Ohms
Resistor 40 —39K Ohms
Resistor 41 —22K Ohms
Capacitor 42 —.20 pf
Coil 43 —500 $\mu$h Resistor 44—82 Ohms
Capacitor 46—5,600 pf
Capacitors 48 and 55—1,000 pf
Diodes 49,50, and 62—1N914
Resistor 54—100 Ohms
Resistor 56—10K Ohms
Capacitor 57—3 $\mu$f.
Resistor 59 and 61—12K Ohms
Resistor 60—4.7K Ohms
NPN transistor 63—2N1711
Capacitor 64—5 $\mu$f.
Resistors 66 and 67—57K Ohms
Resistor 68—16K Ohms
Capacitor 69—6 $\mu$f.

There is hereby provided a radio receiver carrier squelch system wherein signal strength required for unsquelching the radio is advantageously obtained by varying the gain of an AC amplifier through control of IF AGC voltage. Amplification is provided through the squelch circuit with AC amplifier stage characteristics more readily controllable, and more closely, than with a DC amplifier. Furthermore, the squelch action operating point can be made very sensitive if, and as desired, by tailoring the expansion characteristics of the AC amplifier with gain variation control by IF AGC voltage. Further gain after the first AC amplifier stage in the squelch circuit and detection rectification operates on an AC signal with the circuit being readily stabilized for gain against temperature change, transistor parameter changes and changes in supply voltage. Please note while the entire carrier squelch circuit is shown as having one regulated voltage supply 22 that, the circuit operates quite adequately without being fed by a regulated voltage supply and does especially well with regulated supply for the first stage and an unregulated supply for the rest of the carrier squelch circuit. It is of interest that additional selectivity at 500 kHz. may be provided just ahead or behind the expander first stage in the squelch circuit to make the system less sensitive to noise. When using the IF AGC voltage alone, the selectivity is controlled by that provided for the receiver exclusive of the squelch circuit.

Whereas this invention is here illustrated and described with respect to a single embodiment thereof, it should be realized that various changes may be made without departing from the essential contributions to the art made by the teachings hereof.

We claim:

1. In a radio receiver, with an RF amplifier; a signal mixer; an injection frequency source; an IF amplifier; a detector having an audio output and an IF carrier signal rectified DC output; an AGC circuit developing an AGC voltage with the IF carrier signal rectified DC output signal out of the detector and with an AGC voltage circuit gain control connection back to at least one of said amplifiers; an audio circuit connected to the audio output of said detector; and gating means in the audio signal path of the radio receiver after said detector: a squelch circuit having, a gain controlled amplifier with a connection to the AGC circuit for receiving AGC voltage as a gain controlling input, and a connection to the IF signal path as an additional input to the squelch circuit; and with the squelch circuit connected to said gating means for squelch control of the receiver wherein, the connection to the squelch circuit from the radio receiver IF signal path is a carrier AC signal input connection to the gain controlled amplifier as a first amplifier stage of the squelch circuit; and with connection of the gain controlled amplifier to the AGC circuit being an input connection to bias circuit means of said first amplifier stage of the squelch circuit for inverse gain variation control of said first amplifier stage of the squelch circuit from gain variation of a radio receiver amplifier subject to the AGC gain control.

2. The radio receiver of claim 1 wherein, a voltage supply is provided for the squelch circuit.

3. The radio receiver of claim 2 wherein, a voltage supply connection is provided for said bias circuit means of said first amplifier stage in addition to the AGC circuit voltage input connection.

4. The radio receiver of claim 3 wherein, said voltage supply is a regulated voltage supply for at least said first amplifier stage.

5. The radio receiver of claim 3 wherein, said squelch circuit includes, in addition to said first amplifier stage and a DC voltage supply, in successive circuit connected relation: a carrier frequency amplifier; a half-wave rectifier; and trigger circuit means having a squelch gate controlling output connection to said gating means of the receiver.

6. The radio receiver of claim 5, wherein, the gating means of the receiver and the squelch gate controlling output connection includes a diode in a circuit interconnect between the squelch circuit and the audio output circuit path means of said receiver; and with the diode being subject to DC voltage bias determined conduction for controlling said gate means.

7. The radio receiver of claim 6 wherein, said gate means includes a transistor with the base to emitter junction in the audio signal path; and with said diode circuit connected to said transistor as to provide reverse biasing of said transistor base to emitter junction and thereby squelching of the receiver audio.

8. The radio receiver of claim 5 wherein, said trigger circuit means of the squelch circuit is a Schmidt trigger circuit.

UNITED STATES PATENT OFFICE
CERTIFICATE OF CORRECTION

Patent No. 3,569,840 Dated March 9, 1971

Inventor(s) Edward H. Tanaka et al.

It is certified that error appears in the above-identified patent and that said Letters Patent are hereby corrected as shown below:

Column 1, lines 11 to 13, cancel "connected through capacitor 42 and coil 43, in parallel, to the collector out] of NPN transistor 38. The emitter of NPN transistor 38 is connected"; line 14, before "features" insert -- system --; line 19, "along" should read -- alone --. Column 2, line 20 after "signal" insert -- when passed and as such, it would l includable as part of the audio --. Column 4, line 74, ".20' should read -- 120 --.

Signed and sealed this 7th day of March 1972.

(SEAL)
Attest:

EDWARD M.FLETCHER,JR.
Attesting Officer

ROBERT GOTTSCHALK
Commissioner of Pate